(12) United States Patent
Yajima (10) Patent No.: US 8,009,144 B2
(45) Date of Patent: Aug. 30, 2011

(54) PORTABLE TERMINAL UNIT

(75) Inventor: Takayuki Yajima, Kanagawa (JP)

(73) Assignee: Kyocera Corporation, Fushimi-ku, Kyoto (JP)

( * ) Notice: Subject to any disclaimer, the term of this patent is extended or adjusted under 35 U.S.C. 154(b) by 1091 days.

(21) Appl. No.: 10/716,118

(22) Filed: Nov. 18, 2003

(65) Prior Publication Data

US 2004/0257334 A1    Dec. 23, 2004

(30) Foreign Application Priority Data

Nov. 18, 2002    (JP) .............................. P. 2002-333091

(51) Int. Cl.
*G09G 5/00*    (2006.01)
(52) U.S. Cl. ........................................ 345/169; 345/156
(58) Field of Classification Search .................. 345/154, 345/156, 169, 173, 179
See application file for complete search history.

(56) References Cited

U.S. PATENT DOCUMENTS

| | | | | |
|---|---|---|---|---|
| 5,825,353 A * | 10/1998 | Will | ............................... | 345/184 |
| 6,234,389 B1 * | 5/2001 | Valliani et al. | ................. | 235/380 |
| 6,249,672 B1 * | 6/2001 | Castiel | ........................ | 455/575.4 |
| 6,744,624 B2 * | 6/2004 | Siddiqui | ........................ | 361/683 |
| 6,850,226 B2 * | 2/2005 | Finke-Anlauff | .............. | 345/169 |
| 7,257,430 B2 * | 8/2007 | Lenchik et al. | ............ | 455/575.3 |
| 2002/0052193 A1 * | 5/2002 | Chetty | .......................... | 455/412 |
| 2004/0204202 A1 | 10/2004 | Shimamura et al. | | |

FOREIGN PATENT DOCUMENTS

| | | |
|---|---|---|
| JP | 7-288860 | 10/1995 |
| JP | 11-215218 | 8/1999 |
| JP | 2002-135380 | 5/2002 |
| JP | 2002-141984 | 5/2002 |
| JP | 2003-289348 | 10/2003 |
| KR | 2001-0083000 | 8/2001 |

OTHER PUBLICATIONS

Japanese Office Action dated Nov. 28, 2006 with partial English translation.
Korean Office Action dated Aug. 30, 2006.

* cited by examiner

*Primary Examiner* — Quan-Zhen Wang
*Assistant Examiner* — Calvin Ma
(74) *Attorney, Agent, or Firm* — Schulte Roth & Zabel LLP; John C. Garces

(57) ABSTRACT

The opening and closing state detecting section to detect an opening and closing state of the first and the second housing is provided. In the case where an opening motion is conducted after a specific item is selected from the selecting screen, which is displayed on the display section, by the operation of the auxiliary operation section in the closed state of the first and the second housing, the control section controls so that a display screen image corresponding to the specific item can be displayed on the display section.

23 Claims, 9 Drawing Sheets

PORTABLE TERMINAL UNIT

CROSS-REFERENCE TO RELATED APPLICATIONS

This application claims all rights of priority to Japanese Patent Application No. 2002-333091 filed on Nov. 18, 2002, (pending).

BACKGROUND OF THE INVENTION

The present invention relates to a portable terminal unit such as a mobile telephone, PDA (Personal Digital Assistant) or the like, particularly, to a portable terminal unit having a plurality of housings which are respectively coupled to overlap each other.

DESCRIPTION OF THE RELATED ART

Figure 12:
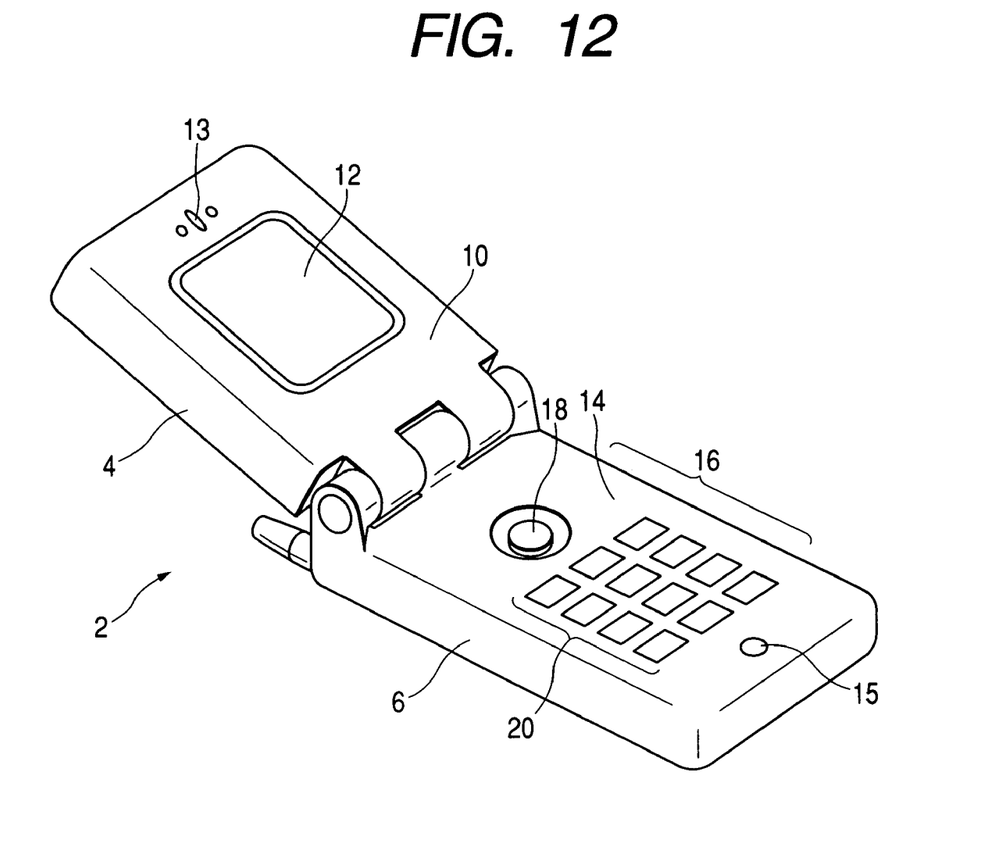
FIG. 12 is a perspective view showing the conventional folding type mobile telephone 2.

Conventionally, a folding type mobile telephone 2 shown in FIG. 12 including two housings which can be folded. In the folding type mobile telephone 2, a display screen 12 such as LCD (Liquid Crystal Display) to display output information and a speaker 13 are provided on an inner face 10 of one housing 4, and a main operation section 16 and a microphone 15 are provided on an inner face 14 of another housing 6.

The main operation section 16 has a cursor key 18 to select items displayed on the display screen 12, and keys 20 for inputting numbers, characters, and other functions.

Figure 7:
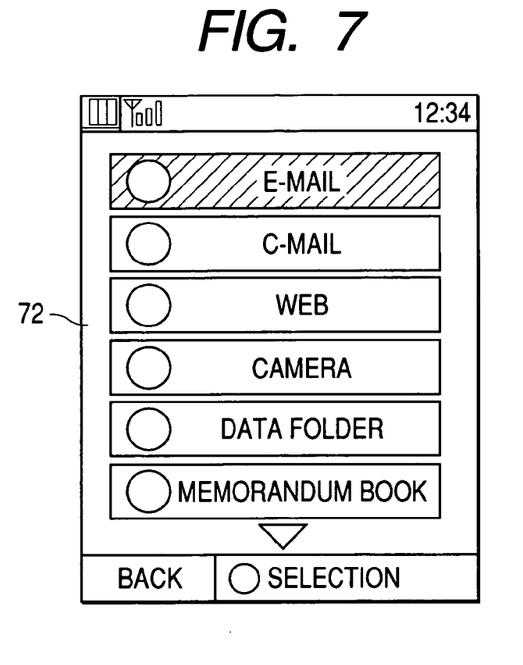
FIG. 7 is a view showing the first function selecting screen 72 displayed on the display screen 12 shown in FIG. 1.

In the folding type mobile telephone 2, the display screen 12 displays various functions of the mobile telephone 2 as a function selecting screen. In order to make a user understand each function, for example, each item is displayed by characters, which are arranged as shown in FIG. 7.

However, the folding type mobile telephone 2 as shown in FIG. 12 has some problems. While the housing 4 and the housing 6 are folded, the display screen 12 cannot be seen unless the housings 4 and 6 are opened. Even though information is displayed on the display screen 12, the information cannot be browsed if it is folded.

In order to solve such a problem, there are mobile telephones in which the display screen 12 is directed outward even in the folded state.

Examples of the mobile telephones of this type are the overlapping type mobile telephones disclosed in JP-A-11-215218, JP-A-2002-141984 and JP-A-2002-135380. These overlapping type mobile telephones are designed so that the display screen provided on one of the housings is directed inward in a state where two housings to be coupled are opened, which is substantially same manner as the folding type portable terminal 2 shown in FIG. 12.

However, different from the above described folding type mobile telephone 2, the overlapping type mobile telephones are designed so that one of the housings can be folded and overlapped on another housing by twisting it 180 degree at a coupling section between the two housings. Therefore, it is possible to overlap the two housings each other with the display face directing outward.

Disclosed in JP-A-7-288860 is another type of the conventional overlapping type mobile telephone. The overlapping type mobile telephone is designed so that one housing, having the display screen, and another housing, having the operation section, are coupled in an overlapped state which the display screen and the operation section are in the same direction through a shaft which passes through these two housings.

This overlapping type mobile telephone can be opened by rotating one housing with respect to another housing around the shaft. Also, the two housings can be kept overlapping each other with the display screen directed outward.

However, in the above overlapping type mobile telephone, a user can see the display screen while the two housings are overlapping each other, but it is impossible to use the main operation section because the main operation section is covered with the housing having the display screen. In order to solve such a problem, as in the case of the overlapping type mobile telephone described in JP-A-7-288860, auxiliary operation keys for conducting a simple operation are provided on a face except for faces of the two overlapped housings opposed to each other.

However, in the case of the above mobile telephone described in JP-A-7-288860, the following problems may be encountered. When creating an e-mail in the E-mail function or editing a document in the memorandum function, for example, after selecting the function by operating auxiliary keys, any inputting work is conducted by operating the ten keys of the main operation section. Therefore, it is necessary for a user to open the housing on the display section side and the housing on the main operation section side. Such operation is troublesome and annoying.

SUMMARY OF THE INVENTION

The object of the invention is to provide a portable terminal unit which enables one to shift to a state where operation by the main operation section is available after each function is selected before the portable terminal unit is opened.

The invention provides a portable terminal unit having: a first housing having at least a display section; a second housing having at least a main operation section, wherein both of said housings are openably and closably coupled together so that said main operation section is covered with said first housing in a closed state and is exposed outside in an opened state, and said display section is exposed outside in both of the closed state and the opened state; an auxiliary operation section provided on other face except for surfaces of both said first and second housings opposed to each other in the closed state; and a control section for controlling so that a selecting screen is displayed on said display section by operating said auxiliary operation section in the closed state and a display screen image corresponding to a specific item is displayed on said display section when said portable terminal unit is brought into an opened state after selecting the specific item from a plurality of items shown in the selecting screen.

Furthermore, the selecting screen is defined as a function selecting screen showing two or more function items out of function items of a mail function, a memorandum function, a schedule book function, a browser function, a message/voice memorandum function, a history function and a camera function.

Furthermore, the selecting screen is defined as a screen showing a plurality of selecting items in one function out of a mail function, a memorandum function, a schedule book function and a camera function.

Furthermore, said portable terminal unit is a mobile telephone.

Furthermore, said portable terminal unit is a personal digital assistant.

Furthermore, said first housing and said second housing are coupled each other so as to be opened and closed by sliding motion.

The invention also provides a portable terminal unit having: a first housing having at least a display section; a second housing having at least a main operation section, wherein both of said housings are openably and closably coupled together so that said main operation section is covered with said first housing in a closed state and is exposed outside in an opened state, and a display screen of said display section are exposed outside in both of the closed state and the opened state; an auxiliary operation section comprising a key or a plurality of keys provided on other surface except for surfaces of both said first and second housings opposed to each other in the closed state; a state detecting section for detecting the opened/closed state of said first housing and said second housing; and a control section for controlling so that a selecting screen is displayed on said display section by operating said key or said part of a plurality of keys in the closed state and a display screen image corresponding to a specific item is displayed on said display section when the state detecting section detects that said portable terminal unit is brought into the opened state from the closed state after selecting the specific item from a plurality of items shown in the selecting screen.

Furthermore, the selecting screen is defined as a function selecting screen showing two or more function items out of function items of a mail function, a memorandum function, a schedule book function, a browser function, a message/voice memorandum function, a history function and a camera function.

Furthermore, the selecting screen is defined as a selecting screen showing a plurality of selecting items in one function out of a mail function, a memorandum function, a schedule book function and a camera function.

Furthermore, said portable terminal unit is a mobile telephone.

Furthermore, said portable terminal unit is a personal digital assistant.

Furthermore, said first housing and said second housing are coupled each other so as to be opened and closed by sliding motion.

The invention also provides a portable terminal unit including a first housing which has a main operation section, a second housing which is subjected to be overlapped on said first housing so as to cover said main operation section, and a coupling section which rotatablly couples one ends of said two housings that relatively rotate around an axis extending in a overlapped direction of said two housings, in which said portable terminal unit is formed in a closed state that said first and second housings are overlapped or in a opened state to be by rotating either of said first and second housings in the closed state 180 degree, having: a display section provided on a surface, which faces in same direction with a surface where said main operation section is provided, of said second housing; an auxiliary operation section comprising a key or a plurality of keys provided on other surface than surfaces, which are opposed each other, of said two housings in the closed state; a state detecting section for detecting the opened/closed state of said first and second housings; and a control section for controlling so that a selecting screen is displayed on said display section by operating said key or said part of a plurality of keys in the closed state and a display screen image corresponding to a specific item is displayed on said display section when the state detecting section detects that said portable terminal unit is brought into the opened state from the closed state after selecting the specific item from a plurality of items shown in the selecting screen.

Furthermore, the selecting screen is defined as a function selecting screen showing two or more function items out of function items of a mail function, a memorandum function, a schedule book function, a browser function, a message/voice memorandum function, a history function and a camera function.

Furthermore, the selecting screen is defined as a selecting screen showing a plurality of selecting items in one function out of a mail function, a memorandum function, a schedule book function and a camera function.

Furthermore, said portable terminal unit is a mobile telephone.

According to the portable terminal unit, even when a function of the item selected which requires operation to be conducted by the main operation section is started, only an opening motion is conducted. After a desired item is selected from the selecting screen displayed on the display screen in the closed state, only an opening motion is conducted to start the selected item automatically. Therefore, it is possible to shift to a state where operation by the main operation section is available wit a simple motion. Accordingly, operations can be simplified and efficiency can be enhanced.

The selecting screen is defined as a function selecting screen showing two or more function items. The function items are the mail function, the memorandum function, the schedule book function, the browser function, the message/voice memorandum function, the history function such as call register and dial history records, and the camera function. Alternatively, the selecting screen is defined as a selecting screen showing a plurality of selecting items, such as the mail function, the memorandum function, the schedule book function and the camera function.

DETAILED DESCRIPTION OF THE PREFERRED EMBODIMENTS

An embodiment of the mobile telephone according to of the invention will be specifically described referring to the drawings.

FIGS. 1 to 11 are drawings to be referred for explaining a mobile telephone 30 according to one embodiment of the invention. A mobile telephone 30 as shown in these drawings will be described with the same reference numbers for the substantially same sections in the conventional folding type mobile telephone. 2, and duplicate description of the substantially same structure will be omitted.

Figure 1:
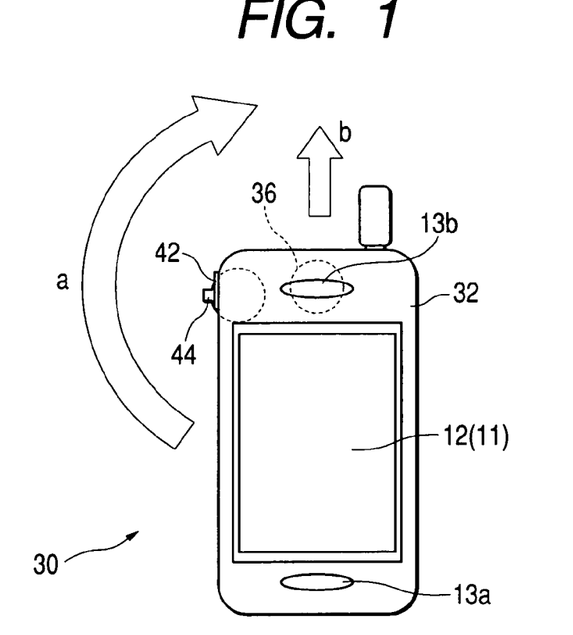
FIG. 1 is a front view of an embodiment of the present invention showing a closed state of the mobile telephone 30.
Figure 2:
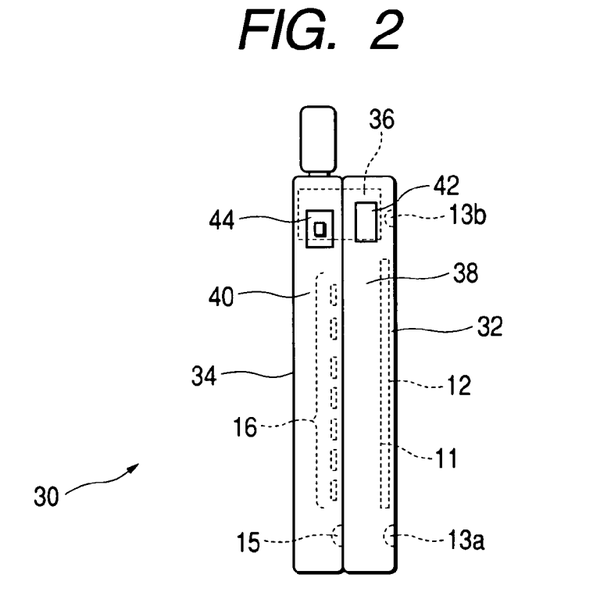
FIG. 2 is a left side view of the mobile telephone 30 shown in FIG. 1.

As shown in FIGS. 1 and 2, this mobile telephone 30 includes a first housing 32 and a second housing 34 which are coupled around a shaft 36 provided in a direction of passing through the first housing 32 and the second housing 34 which are overlapped.

In the mobile telephone 30, a display section 11 is provided on a surface of the first housing 32, which is in an opposite side to the second housing 34, so that a display screen 12 can be seen from outside even when the first housing 32 and the second housing 34 are overlapped. Moreover, an auxiliary operation section having a side key 42 and a three way lever key 44 are provided on faces 38 and 40 of the first housing 32 and the second housing 34, respectfully, so that the mobile telephone 30 can be operated when the first housing 32 and the second housing 34 are overlapped.

Reference numbers 13a and 13b in FIGS. 1 and 2 are speakers arranged on the surface where the display section 11 of the first housing 32 is provided. The speakers 13a and 13b are located in an upper and a lower portion, respectively, interposing the display section 11. Reference number 15 is a microphone located on the surface where the main operation section 16 of the second housing 34 is located.

Figure 3:
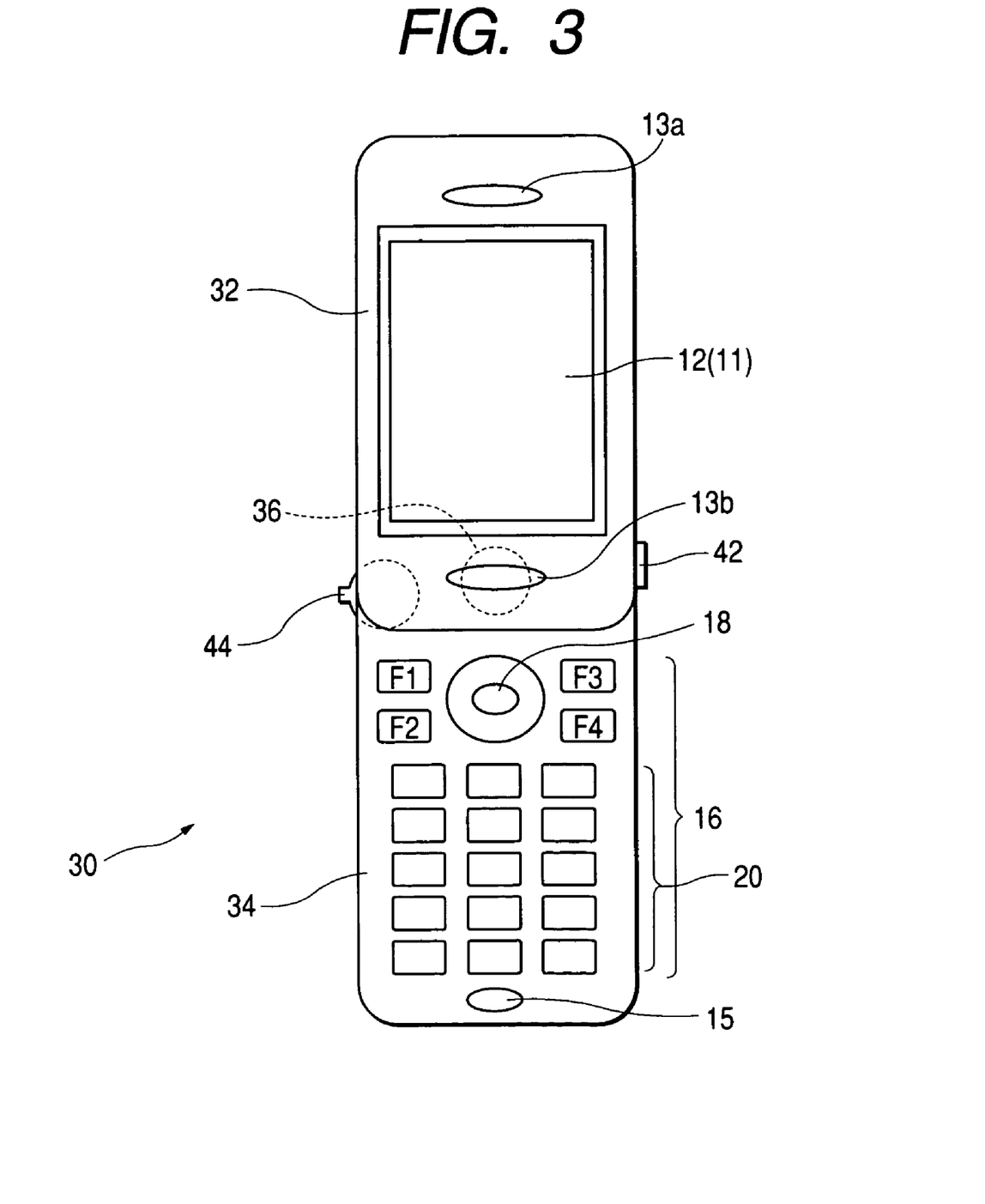
FIG. 3 is a front view of an embodiment of the present invention showing an opened state of the mobile telephone 30.
Figure 4:
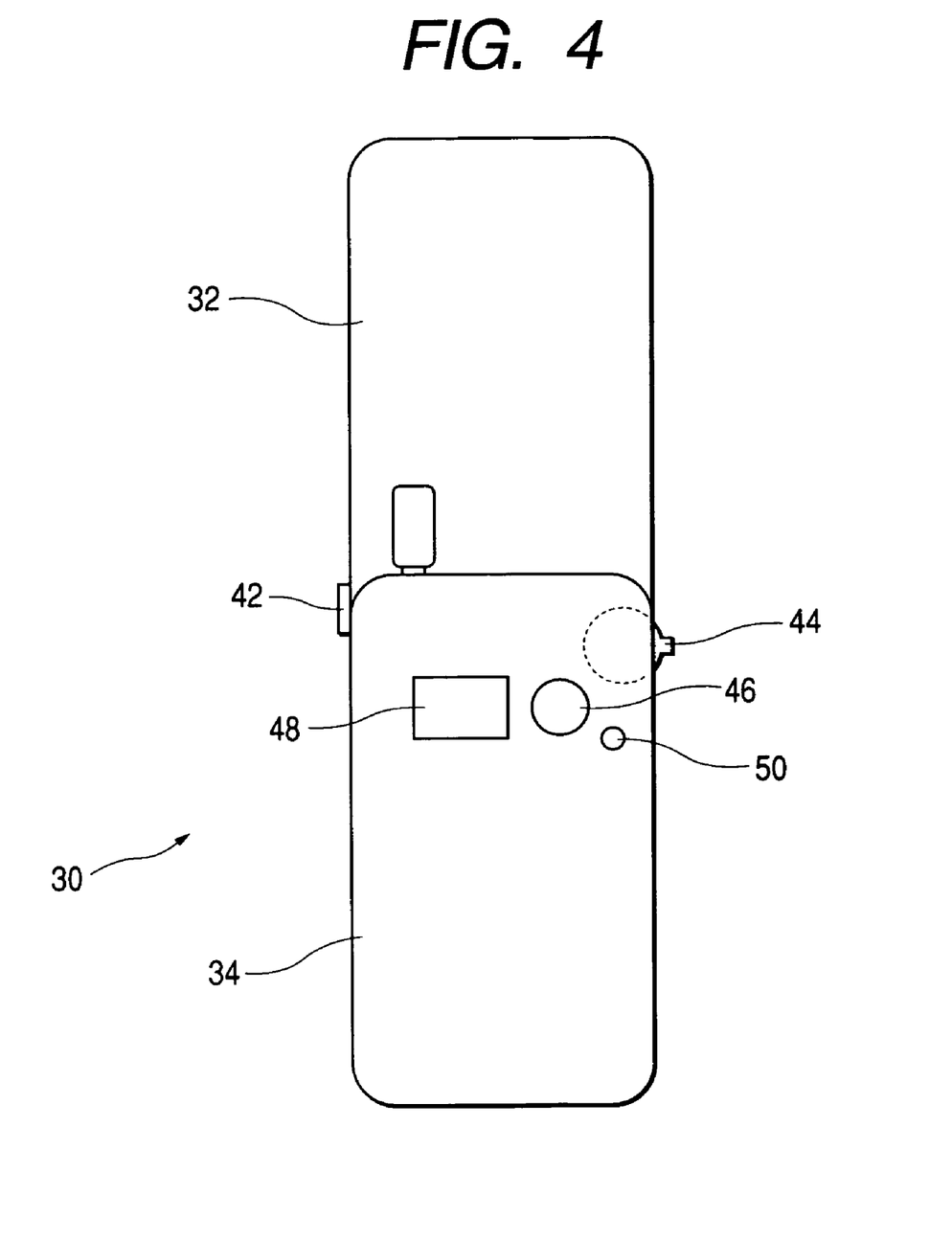
FIG. 4 is a rear view of the mobile telephone 30 shown in FIG. 3.

By rotating the first housing 32 180 degree around the shaft 36 in the direction shown in FIG. 1 by an arrow mark "a", from the state that the first housing 32 and the second housing 34 are overlapped, the mobile telephone 30 can be opened so that the main operation section 16 can be seen as shown in FIGS. 3 and 4. On this occasion, the display screen 12 rotates substantially in the same direction as the main operation section 16. Therefore, it is possible to see the display screen 12 from outside even in the opened state.

Although the mobile telephone 30 of the embodiment is designed so that the first housing 32 rotates around the shaft 36, it can be designed in such a manner, as another embodiment, that, the first housing 32 slides with respect to the second housing 34 in a direction as shown by an arrow mark "b" as shown in FIG. 1.

Alternatively, the mobile telephone can be designed in such a matter that the first housing 32 and the second housing 34 are coupled. So that both housings can fold and twist.

Therefore, even though the mobile telephone is constructed in the above described manner, it can be brought into the state as shown in FIGS. 1 and 2, and the state as shown in FIGS. 3 and 4, as well as the mobile telephone 30 of the embodiment. For this reason, in this invention, the state as shown in FIGS. 1 and 2 is referred to as "an overlapped state" or "a closed state", while the state as shown in FIGS. 3 and 4 is referred to as "an opened state". The rotating or sliding motion of both housings is referred to as "an opening action" to bring the mobile telephone from "the closed state" into "the opened state".

As shown in FIG. 3, the cursor key 18 and the main operation section 16, including keys 20, located on an inner face of the second housing 34 of the mobile telephone 30 can be operated in the opened state. In order to prevent mis-operation in this state, the side key 42 and the three way lever key 44 should be inoperative.

As shown in FIG. 4, the mobile telephone 30 further includes a camera 46, a mirror 48 and a microphone 50 for picture recording on its back face. These members can be operated both in the opened state and in the closed state.

Figure 5:
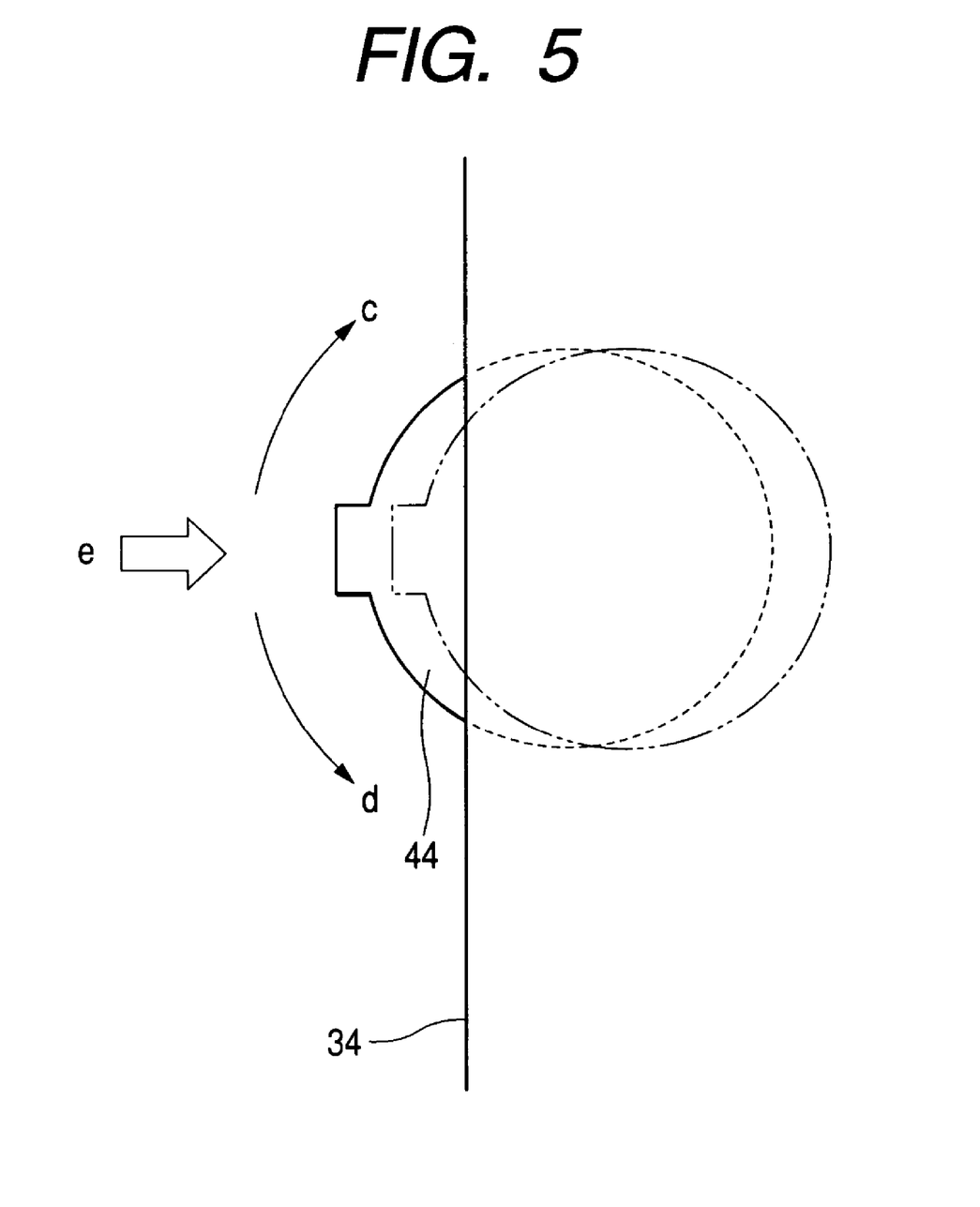
FIG. 5 is a partially enlarged view of the mobile telephone 30 showing the three way lever key 44 shown in FIG. 1.

As shown in FIG. 5, the three way lever key 44 which is used in the closed state can be tilted upward in the direction of an arrow mark "c", and can be tilted downward in the direction of an arrow mark "d", and pushed toward center in the direction of an arrow mark "e".

When the three way lever key 44 is pushed toward center in the closed state, the first function selecting screen 72, in which the function items are arranged in the vertical direction as shown in FIG. 7 (the one-dimensional arrangement), is displayed on the display screen 12. When the three way lever key 44 is moved upward or downward, the function item is selected. The three way lever key 44 is pushed toward center to activate the selected function item. To cancel the select, the side key 42 shown in FIGS. 1 to 4 can be pushed in causing the display screen 12 to return to the previous display.

Figure 6:
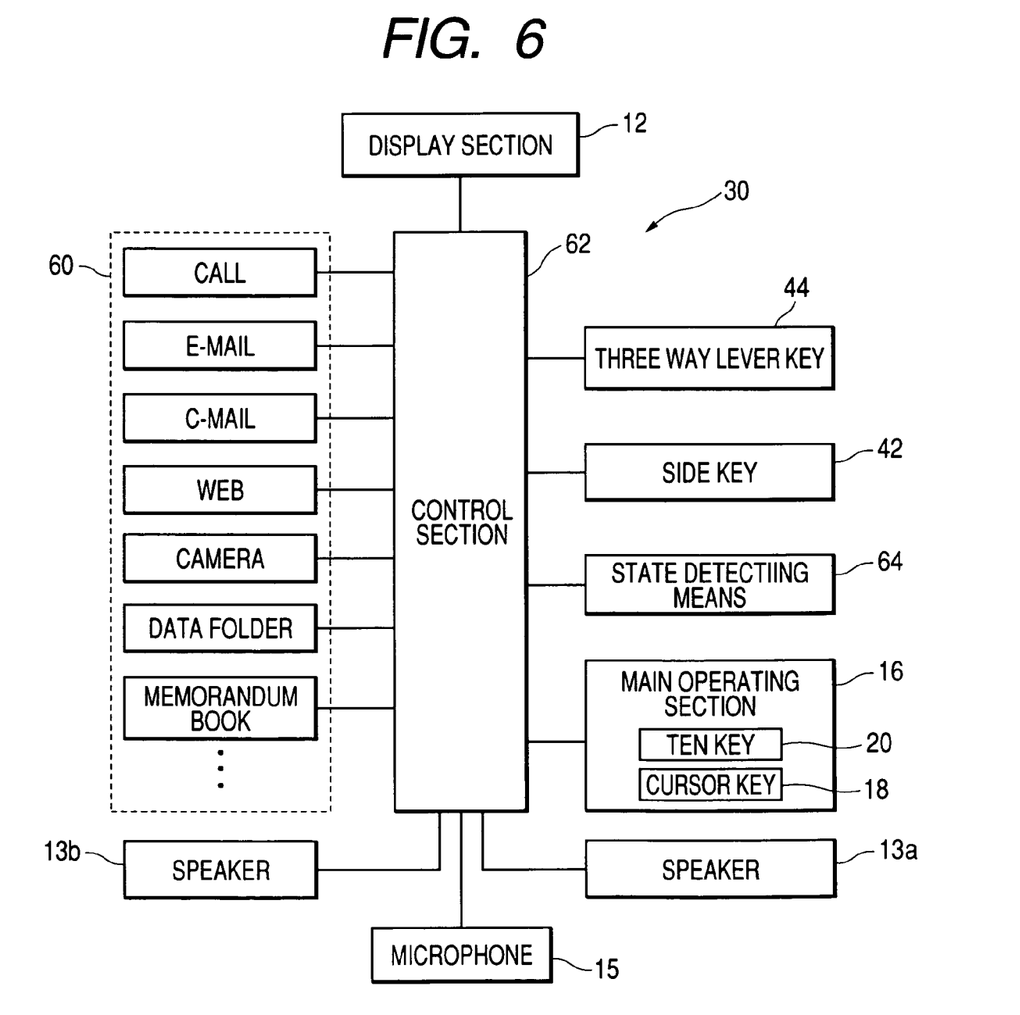
FIG. 6 is a mobile telephone 30 circuit diagram of an embodiment of the present invention.

FIG. 6 is a circuit diagram of the mobile telephone 30. A section, including various functions represented by reference number 60, is controlled by a control section 62 to perform the functions. A state detecting means 64 in this circuit diagram, will detect whether the first housing 32 and the second housing 34 are in the closed state, the opened state or rotating with respect to each other. The state detecting means 64 then outputs corresponding signals to the control section 62.

The state detecting section 64 can have a conductor, which is formed around the shaft 36, so that the rotation of the first housing 32, contacts with the conductor. Otherwise, mechanical switches or sensors might be used.

FIGS. 7 to 10 are views showing the selecting screen (menu panel) displayed on the display screen 12.

FIG. 7 shows the first function selecting screen 72 in the closed state. When the housings are in the closed state, the side key 42 and the three way lever key 44 are operated. Corresponding to the operation of the side key 42 and the three way lever key 44, various functions, each of which is expressed as a row of characters, are arranged in the vertical direction.

In FIG. 7, the frame of the E-mail function item is shown with a background different from the backgrounds of the other functional items. In this way, it is possible to make a user realize that the functional item of E-mail is selected. The user can confirm that the color in the frame to be operated is different from the other functional items. Then, the user pushes the three way lever key 44 toward center so that the functional items can be selected.

Figure 8:
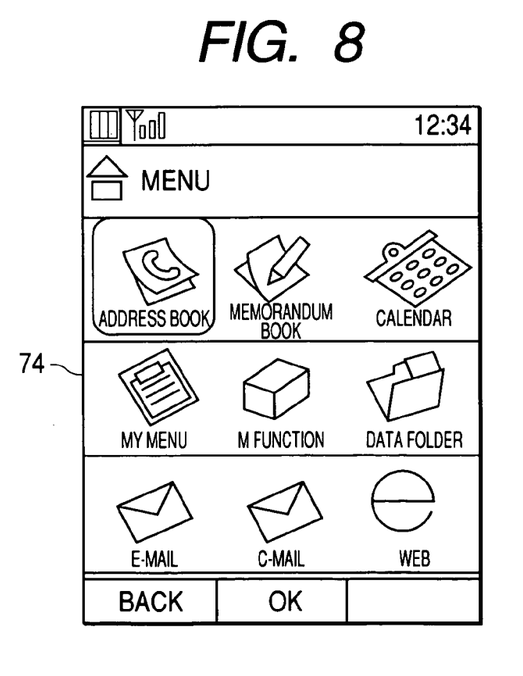
FIG. 8 is a view showing the second function selecting screen 74 displayed on the display screen 12 shown in FIG. 1.

FIG. 8 is a view showing the second function selecting screen 74 when the housings are in the opened state. In the opened state, it is possible to use the cursor key 18 of the main operation section 16 to make a selection. Therefore, various functions are expressed by icons arranged on the second function selecting screen 74 in the vertical and horizontal directions.

In FIG. 8, the icon of the address book is surrounded by a frame so that the user can recognize that the functional item surrounded by the frame has been selected.

Figure 9:
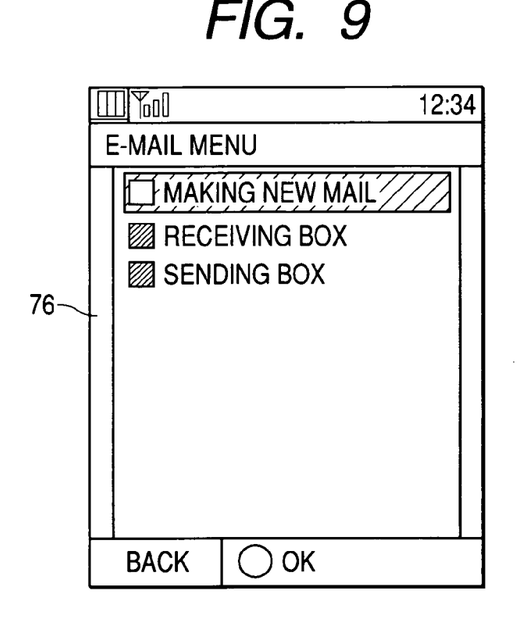
FIG. 9 is a view showing the E-mail function the selecting screen 76 displayed on the display screen 12 shown in FIG. 1.

FIG. 9 is a view showing the selecting screen 76 in the E-mail function in both the closed and opened state. According to the selecting screen 76, it is possible to select either "Making new mail" by which E-mail can be created, "Box of receiving mail" by which E-mail received can be confirmed or "Box of sending mail" by which the content of E-mail to be sent can be confirmed.

Figure 10:
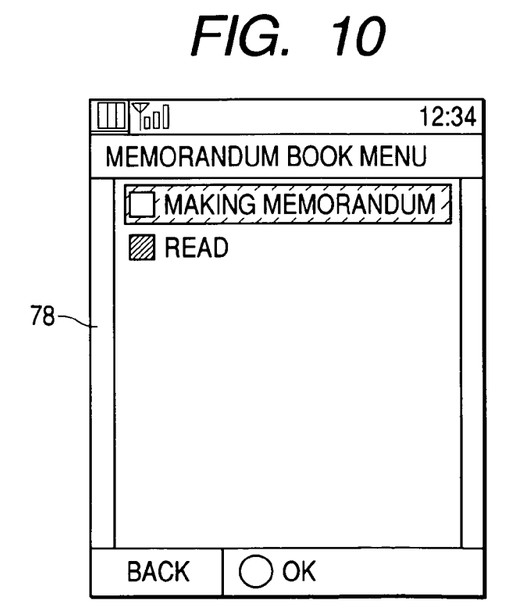
FIG. 10 is a view showing the memorandum book function of the selecting screen 78 displayed on the display screen 12 shown in FIG. 1.

FIG. 10 is a view showing the selecting screen 78 in the memorandum book function in both the closed and opened state. According to this selecting screen 78, it is possible to select either the item of "Making memorandum" by which a memorandum can be made or the item of "Reading" by which the memorandum made can be read.

As described above, the first function selecting screen 72 and the second function selecting screen 74 display the functions of the mobile telephone 30 by items. Therefore, the user can select a specific item from these functional items and start the function.

Like the selecting screen 76 in E-mail function, the selecting screen in the specific function displays the second functional item, which is provided in each function of the mobile telephone 30, by the item. Therefore, the user can select the specific item from the second functional items, in which the specific item is opened, and start the function.

Figure 11:
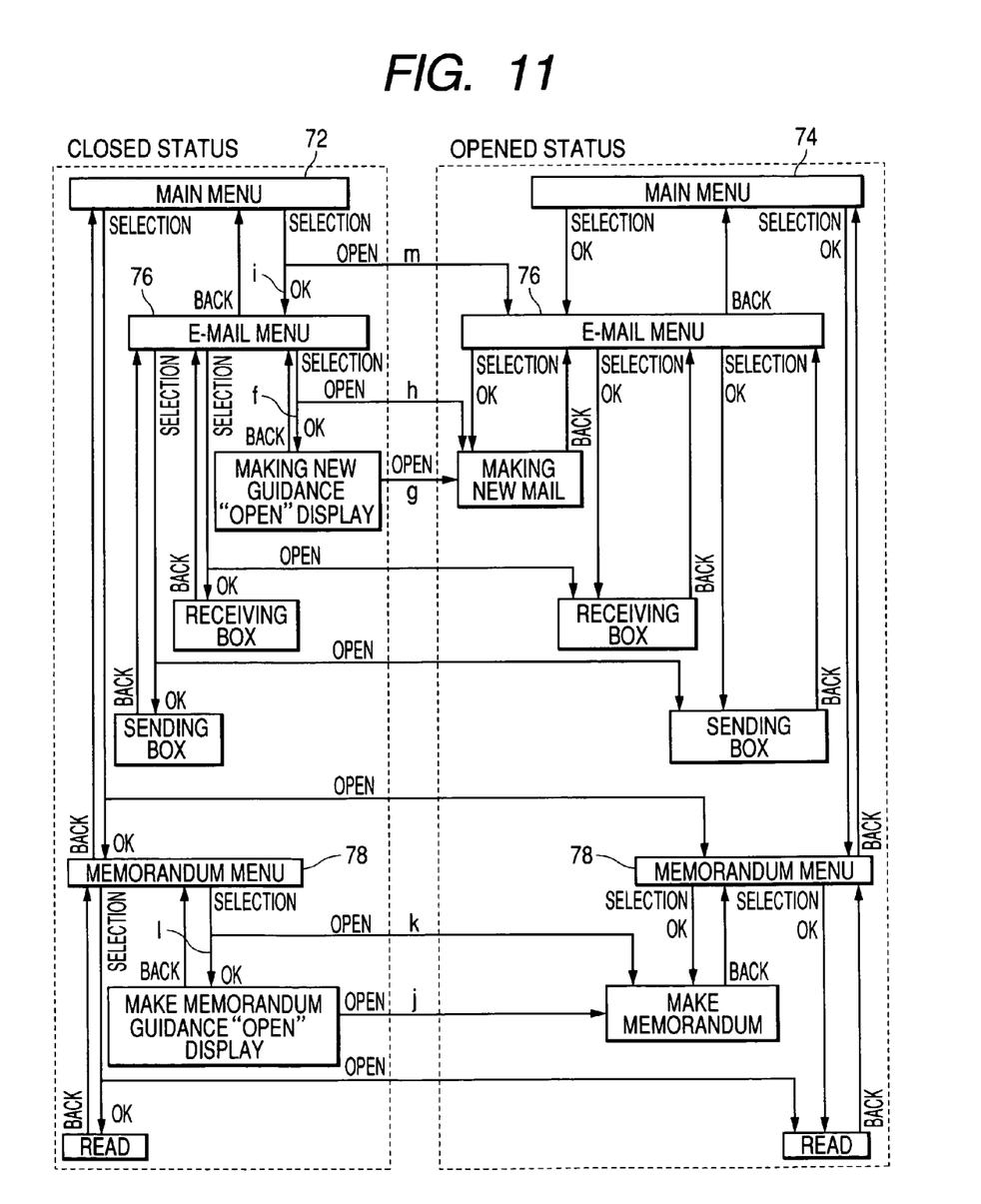
FIG. 11 is an embodiment of the present invention showing a transition diagram of various functions of the mobile telephone 30.

In FIG. 11, the left region surrounded by the dash line expresses a state of operation of various functions of the mobile telephone 30 in the closed state, and the right region surrounded by the dash line expresses a state of operation of various functions of the mobile telephone 30 in the opened state. For example, in the closed state, the selecting screen 76 in E-mail function shown in FIG. 9 is displayed on the display screen 12. In the case where the making a new mail item is "selected" by the vertical operation of the three way lever key 44 and the three way lever key 44 is pushed so that the "OK" operation is activated as shown by an arrow "f" in FIG. 11, the screen shifts to a making a new mail screen (not shown) while the housings are in the closed state, because, in this state it is impossible to use the main operation section 16, the user must open the first housing 32 and the second housing 34 as shown by an arrow "g" in FIG. 11. Therefore, to inform the user to open the first housing 32 and the second housing 34, the message "Open" is displayed on the display screen 12.

On the other hand, in the case where the selecting screen 76 in E-mail function shown in FIG. 9 is displayed on the display screen 12 in the closed state and the making a new mail item is "selected" by the vertical operation of the three way lever key 44, and the first housing 32 and the second housing 34 are opened as shown by arrow "h" in FIG. 11, the state detecting means 64 detects this operation and the screen displays the making a new mail screen. As described above, the operation can be simplified without causing any confusion in the user, and it becomes possible for the user to immediately start making sentences of E-mail.

As shown in FIGS. 1 and 3, when the housings are changed from the closed state to the opened state, the screen on the display screen 12 is upside-down. Of course, the display screen is displayed being inverted by 180° in this case.

In a closed state, where the selecting screen 78 in the memorandum book function shown in FIG. 10 is displayed on the display screen 12 and the making a memorandum item is "selected" by the vertical operation of the three way lever key 44, and the three way lever key 44 is pushed so that the "OK" operation as shown by an arrow "i" in FIG. 11, the screen shifts to a memorandum making screen (not shown in the drawing) in the closed state. Because, in this state it is impossible to use the main operation section 16, the user must open the first housing 32 and the second housing 34 as shown by an arrow "j" in FIG. 11. Therefore, to inform the user to open the first housing 32 and the second housing 34, the message "Open" is displayed on the display screen 12.

On the other hand, in the case where the selecting screen 78 in the memorandum book function shown in FIG. 10 is displayed on the display screen 12 in the closed state and the making a memorandum item is "selected" by the vertical operation of the three way lever key 44, and the first housing 32 and the second housing 34 are opened as shown by an arrow "k" in FIG. 11, the state detecting means 64 detects this operation and the screen displays the making a memorandum screen. As described above, the operation can be simplified without causing any confusion in the user, and it becomes possible for the user to immediately start creating a memorandum.

Even when a function, which does not require the operation conducted by the main operation section 16, is selected from various selecting screen in the closed state, the selected function can be raised either by pushing the three way lever key 44 or by opening the first housing 32 and the second housing 34. For example, in a closed state where the first function selecting screen 72 shown in FIG. 7 is displayed on the display screen 12 and E-mail function is "selected" by pushing the three way lever key 44 toward center as shown by an arrow "l" in FIG. 11, the E-mail function shown in FIG. 9 can be displayed, and the E-mail function can be activated.

In a closed state, where the first function selecting screen 72 shown in FIG. 7 is displayed on the display screen 12 and the E-mail function is "selected" and the first housing 32 and the second housing 34 are opened as shown by an arrow "m" in FIG. 11, the state detecting means 64 detects this operation, and the E-mail function shown in FIG. 9 is displayed on the display screen 12 in the opened state. The use of the E-mail function can be successively conducted.

This operation is conducted in the same manner where the E-mail function shown in FIG. 9 is displayed on the display screen 12 in the closed state and the mail receiving box or the mail sending box item is selected where the memorandum book function shown in FIG. 10 is displayed on the display screen 12 and the reading item is selected.

Accordingly, in the case where the function of either item selected is raised on each selecting screen in the closed state, irrespective of whether or not the operation of utilizing the function can be conducted only by the main operation section 16, the function can be raised by the operation of the three way lever key 44 or the opening action of the mobile telephone 30.

In the case where it is necessary to cancel the "OK" operation when the mobile telephone is in the closed state, the side key 42 is pushed to cancel the "OK" operation and the function is returned to the previous state. When the mobile telephone is in the opened state, the function can be returned to the previous state by the operation of the main operation section 16.

The operation of "selecting" and "deciding (OK)" the items of various functions by the main operation section 16 from the states, which are shown on the second function selecting screen 74 shown in FIG. 8, on the selecting screen 76 in E-mail function shown in FIG. 9 and on the selecting screen 78 in the memorandum function shown in FIG. 10, can be conducted in the same manner as that of the conventional mobile telephone 2.

It is possible to apply the invention to a case in which the function is shifted to the schedule book function, the browser (web) function, the message/voice memorandum function, the history display function and the camera. It is also possible to apply the invention to a case of displaying an image for the memorandum book function, the mail function, the schedule book function and the camera on the display section. The contents of E-mail function and the memorandum book function are not necessarily limited to the contents explained in the embodiment of the present invention.

In the embodiment of the present invention, the example is shown in which the auxiliary operation section of the mobile telephone 30 is arranged on the side faces 38 and 40 of the first housing 32 and the second housing 34, respectively. However, the auxiliary operation section of the mobile telephone 30 may be arranged on a face, which are opposed to each other in the closed state, such as an end face adjacent to the face on which the display section 11 of the first housing 32 is arranged or an end face adjacent to the face on which the main operation section 16 of the second housing 34 is arranged.

However, when consideration is given in the case where the user operates the mobile telephone with a single hand in the closed state, it is preferred that the auxiliary operation section is arranged on the side face adjacent to the face on which the display section 11 of the first housing 32 is arranged and on the side face adjacent to the face on which the main operation section 16 of the second housing 34 is arranged.

In the embodiment of the present invention, when the opening action is conducted in the closed state, the function of the specific item selected on the selecting screen in the closed state is started, and the display screen corresponding to the specific item is displayed on the display screen. The following method may also be adopted. When the state detecting means 64 detects that the closed state has been changed to the opened state, the function with respect to the specific item, which is selected on the selecting screen in the closed state, is started, and the display screen corresponding to the specific item is displayed on the display face. However, in order to immediately start a function with respect to a specific item selected by the selecting screen in the closed state and display a display screen corresponding to the specific item on the display screen in the opened state, it is preferred that a signal is sent to the control section 62 at the stage in which the state detecting means 64 detects a change from the closed state to the opened state.

The embodiment of the mobile telephone of the present invention is explained above. It should be noted that the present invention can be applied to a cellular composed of more than two housings using to the same technical concept.

The present invention can be applied to PDA and the other types of mobile telephones in the same manner.

As explained above, according to the mobile telephone of the embodiment, even when a function of a selecting item which requires operation to be conducted by the main operation section is started, after a desired selecting item is selected from the selecting screen displayed on the display screen in the closed state, only an opening action is conducted to display a display screen corresponding to the selecting item. Therefore, it is possible to shift to a state where operation by the main operation section is available with a simple action. Accordingly, operation can be simplified and the mobile telephone can be more conveniently used.

What is claimed is:

1. A portable terminal unit comprising:
a first housing having at least a display section;
a second housing having at least a main operation section, wherein both said first housing and said second housing are coupled together so that said main operation section is covered with said first housing in a closed state and is exposed in an opened state, and said display section is exposed in both said closed state and said opened state;
an auxiliary operation section provided on either said first housing or said second housing other than on surfaces of said first housing and said second housing opposed to each other in said closed state; and
a control section for controlling said display section in the closed state and in the opened state,
wherein in the closed state said control section controls said display section to display thereon an item selecting screen for selecting an item from a plurality of items, wherein each item of the plurality of items represents functionality that can be activated in response to a state change from the closed state to the opened state, and
wherein in a state where a specific item which requires a text input operation by the main operation section is selected from the plurality of items on the item selecting screen, in response to a state change from the closed state to the opened state, the control section controls said display section to change from the item selecting screen, into displaying a text input screen for the selected specific item,
wherein in a state where a specific item which requires a text input operation by the main operation section is selected from the plurality of items on the item selecting screen, in response to that selection of the specific item is determined by the auxiliary operation section, said control section controls said display section to display thereon a message screen prompting a user to change said portable unit from the closed state into the opened state, and
wherein said control section controls said display section to display thereon a text input screen for the selected specific item in response to a state change from the closed state to the opened state after the message is displayed.

2. The portable terminal unit according to claim 1, wherein the selecting screen displays a plurality of function items.

3. The portable terminal unit according to claim 2 wherein said function items are a mail function, a memorandum function, a schedule book function, a browser function, a message/voice memorandum function, a history function and a camera function.

4. The portable terminal unit according to claim 1, wherein said selecting screen displays a plurality of selecting items for one function item.

5. The portable terminal unit according to claim 1, wherein said portable terminal unit is a mobile telephone.

6. The portable terminal unit according to claim 1, wherein said portable terminal unit is a personal digital assistant.

7. The portable terminal unit according to claim 1, wherein said first housing and said second housing are coupled to each other so as to be opened and closed by a sliding motion.

8. The portable terminal unit according to claim 1, wherein the control section controls the display section to change from displaying an upper layer screen in the closed state into a lower layer screen in response to a state change from the closed state to the opened state.

9. The portable terminal unit according to claim 1, wherein the control section activates a function corresponding to the selected item in response to the state change from the closed state to the opened state, to display the screen image corresponding to the selected item.

10. The portable terminal unit according to claim 1, wherein the auxiliary operation section is configured to input a first signal for selecting an item from the plurality of items on the item selecting screen, and a second signal for determining the selection of the item selected by the first signal.

11. A portable terminal unit comprising:
a first housing having at least a display section;
a second housing having at least a main operation section, wherein both said first housing and said second housing are coupled together so that said main operation section is covered with said first housing in a closed state and is exposed in an opened state, and a display screen of said display section is exposed in both said closed state and said opened state;
a state detecting section for detecting whether said first housing and said second housing are in said opened state or in said closed state;
an auxiliary operation section provided on either said first housing or said second housing other than on surfaces of said first housing and said second housing opposed to each other in said closed state, a control section to control said display section in said closed state and in the opened state, wherein in the closed state said control section controls said display section to display thereon an item selecting screen for selecting an item from a plurality of items, and wherein each item of the plurality of items represents functionality that can be activated in response to a state change from the closed state to the opened state, wherein in a state where a specific item which requires a text input operation by the main operation section is selected from the plurality of items on the item selecting screen, in response to a state change from the closed state to the opened state, the control section controls said display section to change from the item selecting screen, into displaying a text input screen for the selected specific item, wherein in a state where a specific item which requires a text input operation by the main operation section is selected from the plurality of items on the item selecting screen, in response to that selection of the specific item is determined by the auxiliary operation section, said control section controls said display section to display thereon a message screen prompting a user to change said portable unit from the closed state into the opened state, and wherein said control section controls said display section to display thereon a text input screen for the selected specific item in response to a state change from the closed state to the opened state.

12. The portable terminal unit according to claim 11, wherein said selecting screen displays a plurality of function items.

13. The portable terminal unit according to claim 12 wherein said function items are a mail function, a memorandum function, a schedule book function, a browser function, a message/voice memorandum function, a history function and a camera function.

14. The portable terminal unit according to claim 11, wherein said selecting screen displays a plurality of selecting items for one function item.

15. The portable terminal unit according to claim 11, wherein said portable terminal unit is a mobile telephone.

16. The portable terminal unit according to claim 11, wherein said portable terminal unit is a personal digital assistant.

17. The portable terminal unit according to claim 11, wherein said first housing and said second housing are coupled to each other so as to be opened and closed by a sliding motion.

18. A portable terminal unit comprising:

a first housing which has a main operation section; a second housing; a coupling section which rotatably couples said first housing and said second housing, in which said portable terminal unit is in a closed state when said first and second housings are overlapped thereby covering said main operation section or in an opened state by rotating either of said first and second housings to expose said main operation section;

a display section provided on a surface of said second housing, which faces in a same direction as a surface of said main operation section;

a state detecting section for detecting whether first and second housings are in said opened state or said closed state;

an auxiliary operation section provided on either said first housing or said second housing other than on surfaces of said first housing and said second housing opposed to each other in said closed state; and a control section to control said display section in said closed state and in the opened state, wherein in the closed state said control section controls said display section to display thereon an item selecting screen for selecting an item from a plurality of items, and wherein each item of the plurality of items represents functionality that can be activated in response to a state change from the closed state to the opened state, and wherein in a state where a specific item which requires a text input operation by the main operation section is selected from the plurality of items on the item selecting screen, in response to a state change from the closed state to the opened state, the control section controls said display section to change from the item selecting screen, into displaying a text input screen for the selected specific item, wherein in a state where a specific item which requires a text input operation by the main operation section is selected from the plurality of items on the item selecting screen, in response to that selection of the specific item is determined by the auxiliary operation section, said control section controls said display section to display thereon a message screen prompting a user to change said portable unit from the closed state into the opened state, and wherein said control section controls said display section to display thereon a text input screen for the selected specific item in response to a state change from the closed state to the opened state.

19. The portable terminal unit according to claim 18, wherein the selecting screen displays a plurality of function items.

20. The portable terminal unit according to claim 19 wherein said function items are a mail function, a memorandum function, a schedule book function, a browser function, a message/voice memorandum function, a history function and a camera function.

21. The portable terminal unit according to claim 18, wherein said selecting screen displays a plurality of selecting items in one function item.

22. The portable terminal unit according to claim 18, wherein said portable terminal unit is a mobile telephone.

23. The portable terminal unit according to claim 18, wherein said portable terminal unit is a personal digital assistant.

* * * * *